Oct. 8, 1963  C. K. JUDD, JR  3,106,018
AXLE FOR GLASS CUTTERS
Filed June 20, 1960

INVENTOR.
CHESTER K. JUDD, JR.
BY Louis V. Lucia
ATTORNEY.

3,106,018
AXLE FOR GLASS CUTTERS

Chester K. Judd, Jr., Bristol, Conn., assignor to The Fletcher-Terry Company, Forestville, Conn., a corporation of Connecticut
Filed June 20, 1960, Ser. No. 37,305
1 Claim. (Cl. 30—164.95)

This invention relates to glass cutters of the type having a rotatable cutting wheel, and more particularly to a novel form of axle for supporting said wheel which has been found to greatly increase the useful life of a glass cutter.

In glass cutters of the above-described type, a cutting wheel is rotatably mounted on an axle whose opposite ends are supported in a holder. There are a variety of different types of holders presently made, some of which are adapted for use in manual glass cutters and others for use in glass cutting machines. Generally, however, the cutting wheels and axles used in such glass cutters are very small and are therefore subjected to high bearing loads. This, coupled with the fact that the axles are generally made of a softer metal than the wheels, results in very rapid wear of the axles; particularly in glass cutting machines where the pressure applied to the glass cutter is usually considerably greater than that applied to a manually operated cutter.

In all prior glass cutters of the present type known to applicant, an axle of uniform diameter is used to support the cutting wheel. In those cutters where the opposite ends of the axle are not tightly held in the holder, it would be reasonable to assume that the axle would rotate with the cutting wheel, but it has been consistently found that this is not the case. The frictional resistance resulting from the engagement of the opposite ends of the axle with the holder in which it is mounted is apparently of such magnitude that the axle cannot rotate and as a result the axles wear very rapidly at the point of contact with the cutting wheel. The useful life of the cutter, determined by the life of the axle, is consequently very short. This has presented a serious problem, particularly in the operation of glass cutting machines, since much operating time is lost in making frequent changes of the cutting wheel and axle.

The present invention has for its primary object the provision of an axle which is formed in such a way that it will rotate in its holder during rotation of the cutting wheel. The wear caused by the cutting wheel is thus distributed evenly around the entire circumference of the axle and its useful life is greatly extended.

A further object of the invention is to provide an axle which will rotate at a slower speed than the cutting wheel thus preventing excessive wear on the opposite ends of the axle and the holder in which it is mounted.

A still further object of the invention is to provide an axle for glass cutting wheels which is economical to produce and is adapted for use with conventional cutting wheels and holders.

Further objects and advantages of my invention will be more clearly understood from the following description and the accompanying drawing which shows, for purposes of illustration only, one embodiment of my invention and in which.

Figure 1:
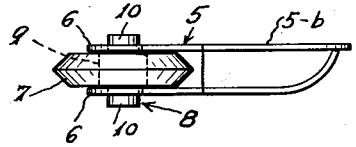
FIG. 1 is an enlarged elevational plan view of a glass cutter unit including my improved axle.
Figure 2:
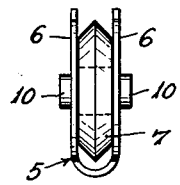
FIG. 2 is an elevational end view of said unit.
Figure 3:
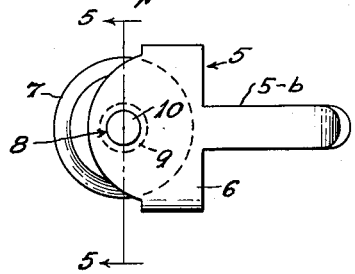
FIG. 3 is an elevational side view thereof.
Figure 4:
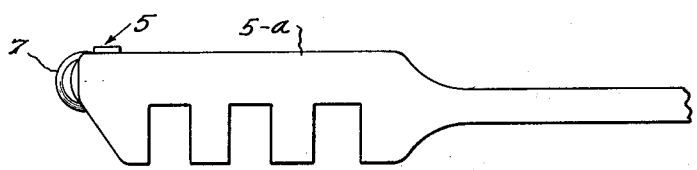
FIG. 4 is an elevational side view of a holder in which such units are adapted to be used.
Figure 5:
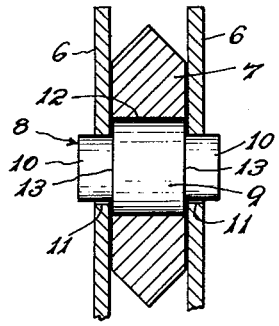
FIG. 5 is an enlarged sectional end view of said unit taken substantially on line 5—5 of FIG. 3.

As shown in the drawing, the numeral 5 denotes a glass cutter unit of generally conventional form which is adapted to be inserted into a head, such as that illustrated at 5–a in FIG. 4, of a manually or machine operated glass cutter. The glass cutter unit 5 includes a holder 5–b which is preferably constructed of sheet metal and is formed into a U-shape to provide spaced side members 6—6 between which a glass cutting wheel 7 is adapted to be mounted for rotation on an axle 8.

In accordance with the present invention, said axle 8 is formed with a central portion 9 and opposite end portions 10—10 which are concentric with, but smaller in diameter than, the said central portion 9. Said end portions 10—10 extend through and are rotatable in coaxial openings 11—11 in the side members 6—6 of the holder.

The cutting wheel 7 contains an axial hole 12 which receives the central portion 9 of the axle, and said cutting wheel is adapted to rotate on said central portion. The width of the wheel 7 is preferably slightly greater than the width of the central portion 9 so that the side members 6—6 of the holder cannot bind against the annular shoulders 13—13 at the opposite sides of said central portion and prevent the axle from rotating in the openings 11—11.

It has been found that an axle constructed in accordance with the present invention will rotate in its holder as the cutting wheel rotates during a glass cutting operation. Extensive experimentation has shown that the axle will rotate at either a constant speed which is slower than the speed of the cutting wheel or intermittently in a step-by-step manner. In either case, as the axle rotates, the wear imparted thereto by the cutting wheel is distributed evenly around its entire peripheral surface and the useful life of the axle is thereby greatly extended which consequently increases the useful life of the entire cutter unit. Under actual operating conditions, glass cutters utilizing my improved axle have had a useful life up to 30% greater than similar cutters incorporating a straight or uniform axle which does not rotate.

The reasons for the phenomena observed in the use of my improved axle are not fully understood. Such axles are very small and an accurate determination of the forces acting thereon is extremely difficult. For example, a typical axle is approximately .106 inch in length. Its central portion is .0625 inch in diameter and .040 inch in width. The end portions are each .048 inch in diameter and .033 inch in length. While I do not wish to be limited in any way to the dimensions specified, they do serve to illustrate the very small size of the axle.

In tests conducted on a variety of glass cutters during the development of the present invention, my improved axle was replaced by a conventional straight axle of substantially the same diameter as the central portion of the new axle then in use, and in each instance it was observed that the conventional axle did not rotate in its holder. This indicates that the frictional force resisting rotation of any axle is greater than the frictional force tending to produce rotation. It is therefore believed that by reducing the diameter of the end portions 10—10 of my improved axle this situation can be reversed and is responsible for its unusual operating characteristics.

Figure 6:
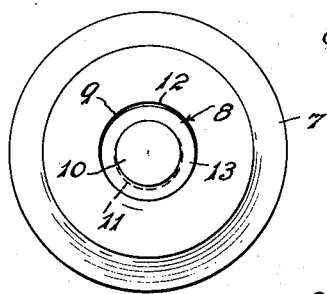
FIG. 6 is a side view of the cutting wheel and axle of said unit.
Figure 7:
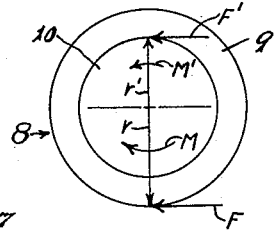
FIG. 7 is a diagrammatic view illustrating a theory of operation of my improved axle.

It will be observed in FIGS. 6 and 7 of the drawing, that during operation of a glass cutter employing my novel axle, the frictional force created through engagement of the cutting wheel 7 with the peripheral surface of the central portion 9 acts through a greater radius with respect to the axis of the axle than the opposing frictional force resulting from the engagement of the peripheral surfaces of the end portions 10—10 with the walls of the openings 11—11. Referring to the FIG. 7, and assuming clockwise rotation of the cutting wheel, it will be observed that the frictional force F applied to the central portion 9 by the rotating cutting wheel acts through a radius $r$ to produce a clockwise turning moment M which is equal to the product of $F \times r$. The frictional force F' resisting the rotation of the end portions 10—10 of the axle acts through a radius $r'$ to produce an opposing moment M' equal to the product of $F' \times r'$. Although the tests above-mentioned have indicated that the frictional force F' opposing rotation of an axle is greater than the frictional force F tending to produce rotation, the fact that the force F' acts through a shorter radius $r'$ apparently reduces the opposing moment M' to a value less than the moment M which results in rotation of the axle. While it is apparent that there is a difference between the moments M and M', it is believed that this difference is slight and that this accounts for the slippage between the cutting wheel and the axle in those cases where the axle rotates at constant rate, but slower than the cutting wheel. This is of considerable advantage, however, since wear on the end portions 10—10 and on the holder is kept at a minimum.

In those instances where the axle rotates intermittently or in a step-by-step manner, it is believed that normal variations in manufacturing tolerances, surface finishes or the like cause an initial difference in the forces acting on the axle in favor of the opposing moment M' resisting its rotation. As the cutting wheel rotates relatively to the axle and the bearing area between the wheel and the central portion increases as the result of wear, the frictional force F on the axle builds up to the point where the turning moment M becomes greater than the opposing moment M', whereupon the axle turns slightly to present a new surface on the central portion to the cutting wheel. This process occurs repeatedly during operation of the cutting wheel to cause the intermittent step-by-step rotation of the axle.

There are, of course, many other variables affecting the operation of glass cutters employing my novel axle which may or may not account for its rotation. Some of these are the type of lubrication used, the materials from which the axle, cutting wheel and holder are made, the accumulation of glass particles between the bearing surfaces of the parts and the pressure applied to the wheel. These are factors which are difficult, if not impossible, to calculate with any degree of accuracy, but in spite of these unknowns, it is believed that the above-mentioned theory accounts for the unusual results obtained with my novel axle.

I claim:

A mechanism for cutting glass including a rotatable axle having a cylindrical central portion and reduced terminal portions formed integrally with and extending from said central portion, a cutting wheel carried by the axle for rotation on the central portion about an axis substantially common to the axis of rotation of the axle, and a holder having opposed side members spaced to receive the cutting wheel therebetween including mounting means defined by opposed openings in the side members coaxial with the axis of rotation of the axle to receive the said terminal portions for rotation therein to permit simultaneous rotation of the cutting wheel on the central portion of the axle and rotation of the axle with respect to both the holder and the cutting wheel during a glass cutting operation, the width of the said cutting wheel being greater than the axial extent of the central portion of the axle to prevent binding of the said central portion against the spaced side members of the holder while rotating relatively thereto.

References Cited in the file of this patent

UNITED STATES PATENTS

| 1,562,644 | Jones | Nov. 24, 1925 |
| 2,312,635 | Fletcher | Mar. 2, 1943 |
| 2,957,241 | Martin | Oct. 25, 1960 |

FOREIGN PATENTS

| 100,133 | Switzerland | July 16, 1923 |
| 671,803 | France | Sept. 9, 1929 |